United States Patent [19]
Cuevas

[11] Patent Number: 5,335,940
[45] Date of Patent: Aug. 9, 1994

[54] AIR BAG INFLATOR HAVING FLOW CONTROL FOR SLOWING AND FILTERING INFLATION GAS

[75] Inventor: Jess Cuevas, Scottsdale, Ariz.

[73] Assignee: TRW Inc., Lyndhurst, Ohio

[21] Appl. No.: 129,487

[22] Filed: Sep. 29, 1993

Related U.S. Application Data

[63] Continuation of Ser. No. 845,183, Mar. 3, 1992, abandoned.

[51] Int. Cl.[5] ............................................. B60R 21/26
[52] U.S. Cl. .................................... 280/737; 280/740
[58] Field of Search ............... 280/728 R, 728 A, 730, 280/732, 736, 740, 741, 742; 102/530, 531; 222/3; 422/164, 165, 166, 167

[56] References Cited

U.S. PATENT DOCUMENTS

| | | | |
|---|---|---|---|
| 3,414,292 | 12/1968 | Oldberg | 280/740 |
| 3,618,981 | 11/1971 | Leising et al. | |
| 3,655,217 | 4/1972 | Johnson | 280/737 |
| 4,005,876 | 2/1977 | Jorgensen et al. | 102/531 |
| 4,084,839 | 4/1978 | Okazaki et al. | |
| 4,943,086 | 7/1990 | Cunningham | 280/741 |
| 4,981,534 | 1/1991 | Scheffe | 280/741 |
| 4,998,750 | 3/1991 | Werner et al. | 280/740 |
| 5,016,914 | 5/1991 | Faigle et al. | |
| 5,031,932 | 7/1991 | Frantom et al. | 280/737 |

FOREIGN PATENT DOCUMENTS

| | | | |
|---|---|---|---|
| 2330194 | 12/1974 | Fed. Rep. of Germany | 280/740 |
| 52-11533 | 1/1977 | Japan | 280/740 |

*Primary Examiner*—Karin L. Tyson
*Attorney, Agent, or Firm*—Tarolli, Sundheim & Covell

[57] ABSTRACT

An apparatus 10 for inflating a vehicle occupant restraint such as an air bag includes a gas source 14 having an axis 50 and a quantity of gas 12 therein. An outlet 30 in the gas source establishes axial flow of gas from the gas source. A flow control member 40 disposed in the path of gas flow establishes radial and circumferential flow of gas to remove particles from the flowing gas by centrifugal force. The a flow control member includes at least one circumferentially extending passage 72 for producing centrifugal force to remove particulate matter from gas flowing in the passage.

9 Claims, 4 Drawing Sheets

AIR BAG INFLATOR HAVING FLOW CONTROL FOR SLOWING AND FILTERING INFLATION GAS

This is a continuation of copending application Ser. No. 07/845,183 filed on Mar. 3, 1992 now abandoned.

BACKGROUND OF THE INVENTION

1. Technical Field

The present invention relates to an air bag inflator, and more particularly to apparatus for controlling the gas flow from an air bag inflator and for filtering the gas flowing from an inflator.

2. Description of the Prior Art

A known vehicle safety apparatus includes an air bag and an inflator for providing gas to inflate the air bag. The inflator includes a gas source. Upon actuation of the inflator, gas is directed from the gas source into the air bag to inflate the air bag. It is desirable to control the pressure in the air bag so that the air bag inflates by a desired amount over a desired time period. Controlling the rate of gas flow into the air bag controls the pressure in the air bag to establish a desired pressure-time curve for air bag inflation. It is also desirable to remove from the gas flowing into the air bag any particulate and molten matter in the gas. Such particulate and molten matter may be generated by the gas source upon actuation of the inflator.

SUMMARY OF THE INVENTION

The present invention is an apparatus for inflating a vehicle occupant restraint such as an air bag. The apparatus comprises a gas source having an axis, outlet means for establishing axial flow of the gas from the gas source, and flow control means located in the path of gas flow from the gas source. The flow control means is disposed coaxial with and offset axially from the gas source. The flow control means has means for establishing radial and circumferential flow of gas comprising a first circumferentially extending gas flow passage, a second circumferentially extending gas flow passage spaced radially outward of the first passage, and means for establishing radial flow of gas from the first passage to the second passage. The flow control means directs the gas into the air bag. Particles and molten matter are removed from the gas as it flows radially and circumferentially.

In a preferred embodiment of the invention, the flow control means includes a radially extending wall disposed in the path of gas flowing axially from the outlet means. The radially extending wall deflects the axially flowing gas radially outwardly into the circumferentially extending passages which are defined by a plurality of circumferentially extending walls. Centrifugal force acting on gas flowing circumferentially in the passages causes particulate matter in the gas to move radially outwardly and collect on a radially inner surface of one of the circumferentially extending walls. Also, the circumferentially extending walls cool the gas so that molten matter in the gas plates out on the walls. Radial openings in the passage walls allow gas to flow radially outward into the air bag.

The flow control means may also include means for establishing two discrete flow paths for gas flowing from the gas source into the air bag. The first gas flow path is radial and directs a first portion of the gas into the air bag in a relatively short period of time. The second gas flow path is circumferential and directs a second portion of the gas into the air bag in a relatively longer period of time. The amount of gas directed into each flow path can be controlled to establish a desired pressure-time curve for air bag inflation.

BRIEF DESCRIPTION OF THE DRAWING

The foregoing and other features of the present invention will become apparent to one skilled in the art to which the present invention relates upon a consideration of the following description of the invention with reference to the accompanying drawings, wherein.

DESCRIPTION OF PREFERRED EMBODIMENT

Figure 1:
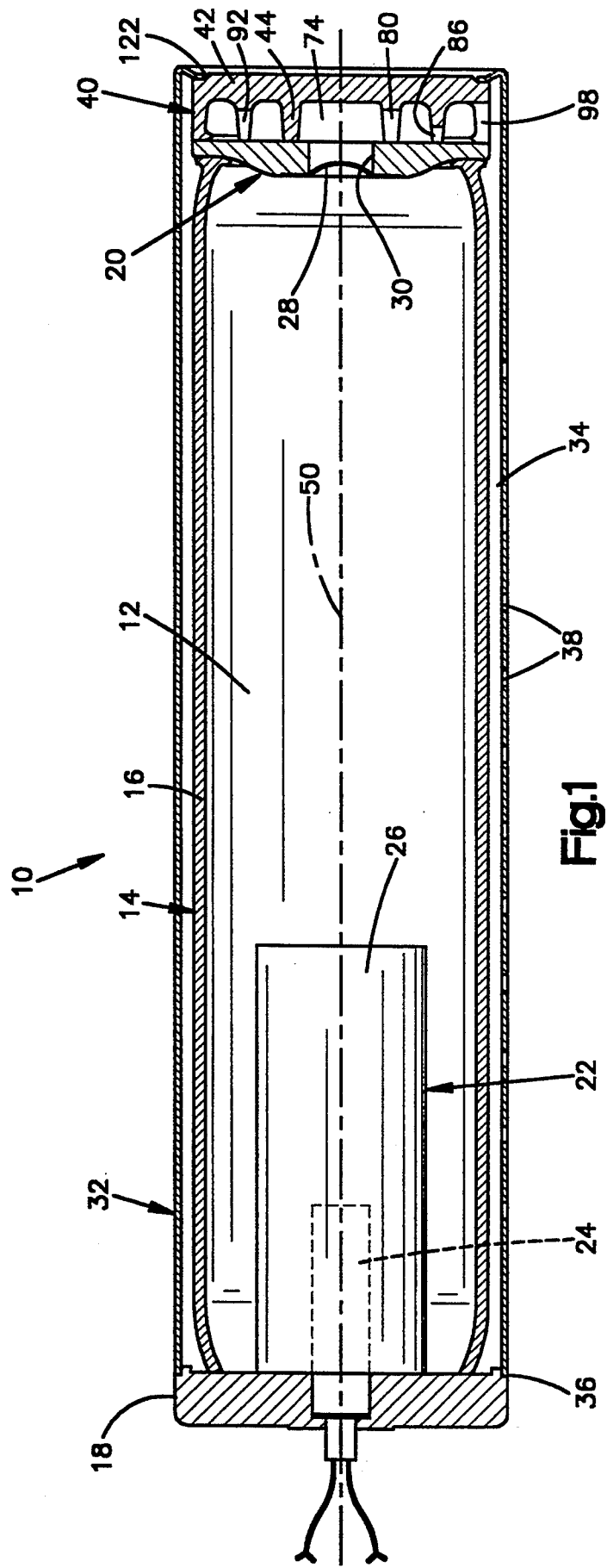
FIG. 1 is a longitudinal sectional view of an inflator embodying the present invention.

The present invention relates to an air bag inflator and particularly to an inflator for inflating an air bag to protect an occupant of a vehicle. The present invention is applicable to various inflator constructions. As representative of the present invention, FIG. 1 illustrates an inflator 10 for inflating an air bag (not shown) to protect an occupant of a vehicle in the event of sudden deceleration such as occurs in a collision.

The inflator 10 is an augmented inflator. The inflator 10 includes a quantity of gas 12 stored under pressure in a container 14. The gas 12 is preferably argon, although other gases such as nitrogen or air could be used. The container 14 includes a housing 16 and two end caps 18 and 20. An initiator assembly 22, which includes an initiator 24 and a quantity of combustible gas generating material 26, is disposed in the container 14 adjacent the end cap 18. A burst disk 28 seals a gas outlet opening 30 in the end cap 20.

A cylindrical diffuser 32 extends around the container 14. The container 14 and the diffuser 32 define between them an annular diffuser chamber 34. One end of the diffuser 32 is secured at 36 to the end cap 18. The other end of the diffuser 32 is connected with the end cap 20 in a manner to be described below. The diffuser 32 has a series of outlets 38 along its length to direct gas from the diffuser chamber 34 into an air bag (not shown) disposed adjacent the inflator 10.

The inflator 10 includes a maze 40 for controlling and filtering the gas flowing out of the container 14. The maze 40 is preferably a one-piece metal casting. The maze 40 has a radially extending main body portion 42. A plurality of circumferentially extending arcuate walls (FIGS. 2 and 3) project axially inwardly from the main body portion 42.

The radially innermost wall 44 has a cylindrical inner surface 46 (FIG. 3) and a cylindrical outer surface 48. The wall 44 is generally circular in shape and extends circumferentially around the outlet 30 and the longitudinal axis 50 of the inflator 10. A second wall 52 is disposed radially outward of the wall 44 and also extends circumferentially around the outlet 30 and the axis 50. The wall 52 has a cylindrical inner surface 54 and a cylindrical outer surface 56. A radially outermost wall 58 is disposed radially outward of the wall 52 and also extends circumferentially around the outlet 30 and the axis 50. The wall 58 has a cylindrical inner surface 60 and a cylindrical outer surface 62.

Between the radially outermost wall 58 and the wall 52 is a circumferentially extending arcuate passage 70 defined by the inner surface 60 of the wall 58 and the outer surface 56 of the wall 52. Between the wall 52 and the wall 44 is a circumferentially extending arcuate passage 72 defined by the inner surface 54 of the wall 52 and the outer surface 48 of the wall 44. The passages 70 and 72 are concentric. The walls 44, 52 and 58 have a center of curvature coincident with the axis 50.

Disposed radially inside the wall 44 is a central maze chamber 74 bounded by the cylindrical inner surface 46 of the wall 44 and a radially extending wall surface 76 of the main body portion 42. The chamber 74 is axially aligned with and in fluid communication with the opening 30 (FIG. 2) in the end cap 20.

A radially extending opening 80 (FIG. 3) in the wall 44 is defined by end surfaces 82 and 84 of the wall 44. The opening 80 provides for fluid communication between the central maze cheer 74 and the circumferentially extending passage 72.

A first opening 86 in the wall 52 is defined by end surfaces 88 and 90 of the wall 52. The opening 86 in the wall 52 is aligned circumferentially with the opening 80 in the wall 44. A second opening 92 in the wall 52 is defined by end surfaces 94 and 96 of the wall 52. The opening 92 is diametrically opposite and larger than the openings 80 and 86. The openings 86 and 92 in the wall 52 provide for fluid communication between the circumferentially extending passages 72 and 70.

An opening 98 in the wall 58 is defined by end surfaces 100 and 102 of the wall 58. The opening 98 is aligned circumferentially with the opening 86 in the wall 52 and with the opening 80 in the wall 44. The opening 98 is radially outward of the passages 70 and 72 and is at the same location along the axis 50 of the inflator 10 as the passages 70 and 72. The opening 98 in the wall 58 is larger than the openings 80, 86 and 92 and provides for fluid communication between the circumferentially extending passage 70 and the diffuser chamber 34.

The maze 40 is secured to the end cap 20 (FIG. 2) by friction welding at a weld joint 114. The friction welding process results in the formation of a slag curl 116 radially inward of the weld joint 114. The slag curl 116 is preferably cut away adjacent the opening 98 in the wall 58, to allow free flow of gas through the opening 98. A second slag curl (not shown) is also formed radially outward of the weld joint 114. This latter slag curl is removed to allow free flow of gas into and within the annular chamber 34. The end cap 20 is, in turn, secured to the housing 16 by friction welding at a weld joint 118, forming slag curls 120 and 122. An end portion of the diffuser 32 is welded at 123 to the main body portion 42 of the maze 40.

Figure 2:
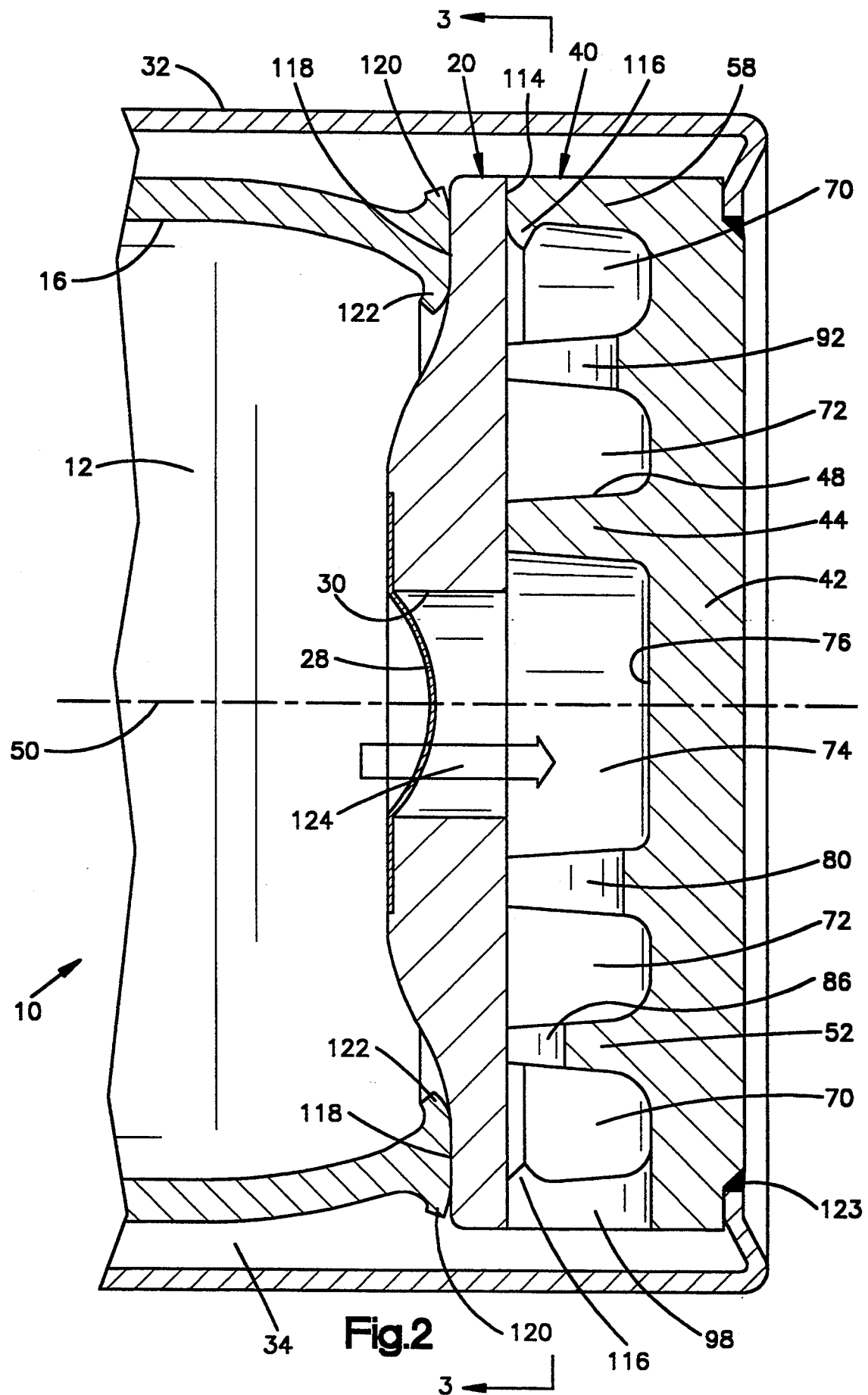
FIG. 2 is an enlarged view of a portion of the inflator of FIG. 1.
Figure 3:
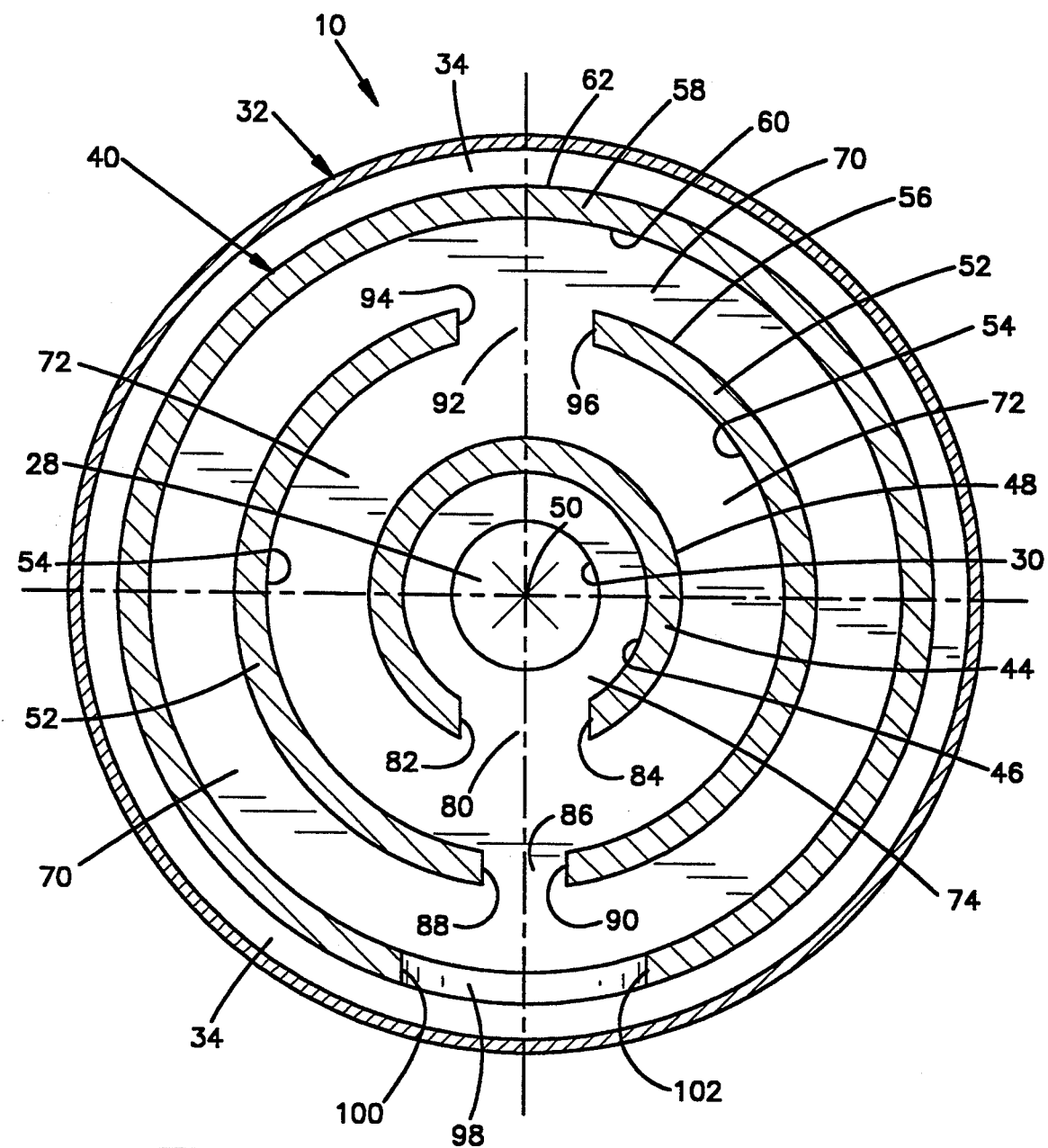
FIG. 3 is a transverse sectional view taken along line 3—3 of FIG. 2.

Upon actuation of the inflator 10, the initiator assembly 22 heats the gas 12 in the container 14 to raise its pressure. The initiator assembly 22 also generates additional gas by burning of the gas generating material 26, to augment the gas stored in the container 14. When the gas pressure in the container 14 reaches a predetermined level, the burst disk 28 bursts axially outwardly, allowing gas from the container 14 to flow axially out of the container 14, in the direction indicated by the arrow 124 (FIG. 2).

Figure 4:
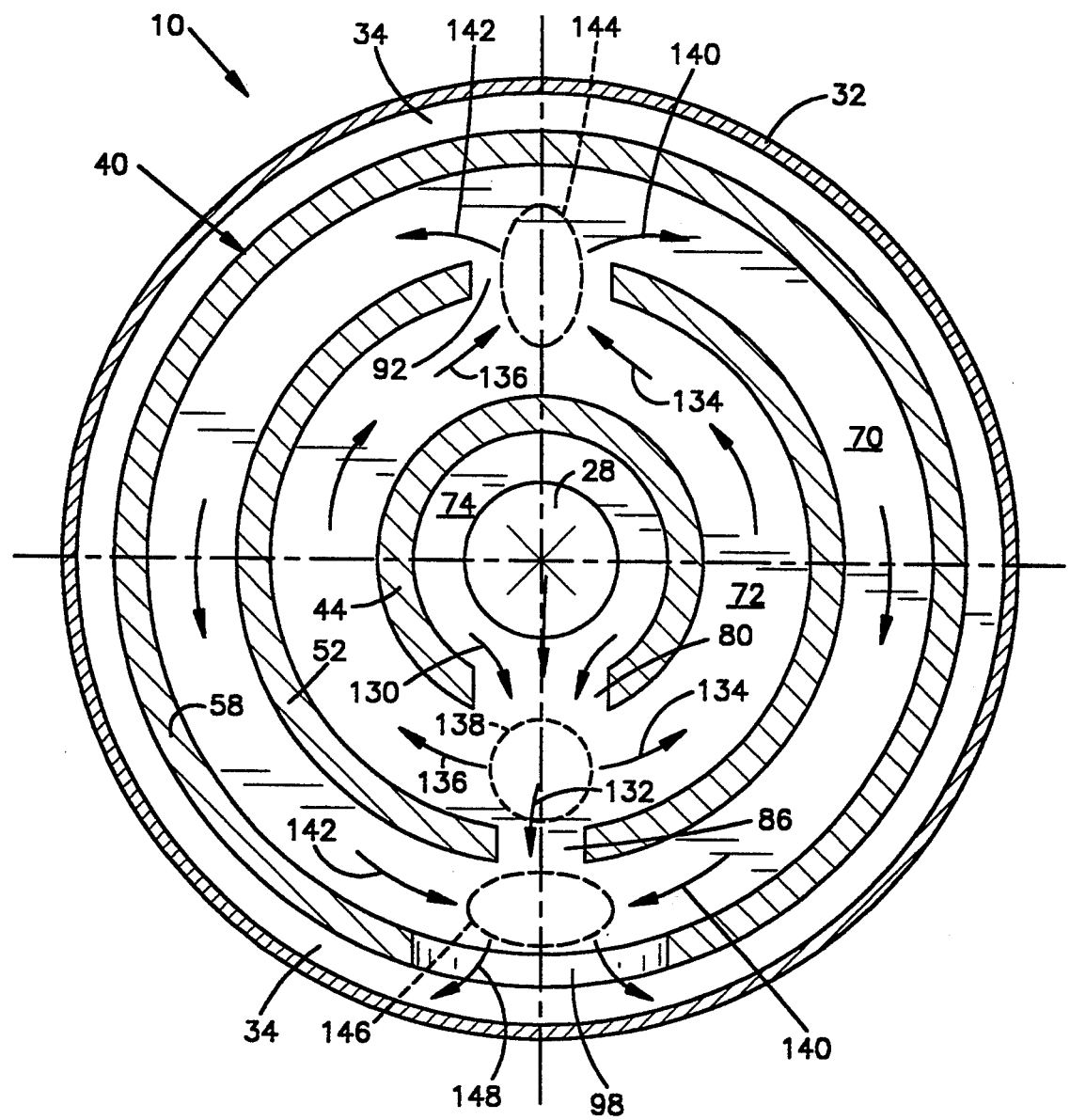
FIG. 4 is a view similar to FIG. 3 showing the direction of gas flow through the portion of the inflator shown in FIGS. 2 and 3.

The gas 12 flows axially through the opening 30 in the end cap 20 into the central maze chamber 74. The axially flowing gas contacts the radially extending wall surface 76 of the maze 40. The wall surface 76 changes the direction of flow of the gas and causes the gas to flow radially outwardly from the central maze chamber 74 through the opening 80 in the wall 44, as indicated by the arrows 130 in FIG. 4.

A portion of the gas flowing outward through the opening 80 continues to flow radially outward through the opening 86 in the wall 52, as indicated by the arrow 132, and through the opening 98 in the wall 58. This direct flow of gas into the annular chamber 34 produces a rapid initial flow of gas into the air bag to help establish the desired pressure-time curve for air bag inflation. In a preferred embodiment, about 10% of the gas provided by the inflator 10 flows directly into the air bag by this path. This percentage is controlled by the circumferential and axial extent of the opening 86. For example, the opening 86 in the wall 52 in the preferred embodiment has a lesser axial extent (FIG. 2) and circumferential extent (FIG. 3) than the openings 80 and 92.

The remainder of the gas flowing outwardly through the opening 80 strikes wall 52 and changes direction to flow circumferentially in the passage 72. A first portion of this gas flows in one circumferential direction in one portion of the passage 72, as indicated by the arrows 134. A second portion of this gas flows in the opposite circumferential direction in the other portion of the passage 72, as indicated by the arrows 136. Because the gas flowing through the opening 80 is divided to flow in three different directions, an area of turbulence is created adjacent the opening 80 as indicated schematically by the dashed line 138. This turbulence slows the rate of gas flow into the air bag.

The gas flowing circumferentially in the two portions of the passage 72, as indicated by the arrows 134 and 136, then flows radially outwardly through the opening 92 into the passage 70. A first portion of this gas strikes wall 58 and flows in one circumferential direction in one portion of the passage 70, as indicated by the arrows 140. A second portion of this gas strikes wall 58 and flows in the opposite circumferential direction in the other portion of the passage 70, as indicated by the arrows 142. Because the flow of gas through the opening 92 strikes wall 58 and is divided into two different flow paths, an area of turbulence is created adjacent the opening 92 as indicated schematically by the dashed line 144. This turbulence also slows the rate of gas flow into the air bag.

The gas flowing circumferentially in the two portions of the passage 70, as indicated by the arrows 140 and 142, then passes radially outwardly through the opening 98 into the annular chamber 34, as indicated by the arrows 148. This gas mixes with the direct flow of gas indicated by the arrow 132 from the central chamber 74 through the openings 80 and 86. The gas flowing radially outwardly through the opening 98 changes flow direction and flows axially and circumferentially in the annular chamber 34. Accordingly, yet another area of turbulence is created in the maze 40 as indicated schematically by the dashed line 146. This turbulence also slows the rate of gas flow into the air bag.

The dimensions and configuration of the cheer 74 and the passages 72 and 70, as well as the size and locations of the radial openings 80, 86, 92, and 98, can be varied to control the rate of gas flow into the air bag and establish the desired pressure-time curve for air bag inflation. Other changes in the configuration of the maze 40 are possible also. For example, the radially outermost wall 58 can be eliminated to allow gas to flow from the passage 72 into the diffuser chamber 34. Alternatively, a greater number of arcuate passages can be provided around the outlet 30. The walls 44, 52, and 58 need not be circular. The opening 86 may be omitted if it is not desired to establish a direct flow of gas into the air bag. It can thus be seen that the maze 40 can be configured in many different ways to control the rate of gas flow into the air bag to establish a desired pressure-time curve for air bag inflation.

The maze 40 also establishes two discrete flow paths for gas flowing from the container 14 into the air bag. The first gas flow path is radial through the openings 80, 86 and 98 and into the air bag. This first gas flow path is relatively short. The second gas flow path is circumferential through the passages 72 and 70 and into the air bag. The second gas flow path is longer than the first gas flow path, and thus gas traversing the second gas flow path takes a longer period of time to reach the air bag. The configuration of the maze 40 can be varied to change the amount of gas directed into each flow path to establish a desired pressure-time curve for air bag inflation.

The maze 40 also filters the gas flowing into the air bag. The initiator assembly 22 can produce particulate and molten matter in the gas flowing out of the container 14 through the opening 30. It is desirable to prevent this matter from passing into the air bag. To this end, the maze 40 produces circumferential flow of gas in the passages 70 and 72 as described above. Centrifugal force acting on the gas flowing circumferentially in the passage 72 causes particulate matter in the gas to move radially outwardly and collect on the cylindrical inner surface 54 of the wall 52. Also, centrifugal force acting on the gas flowing circumferentially in the passage 70 causes particulate matter in the gas to move radially outwardly and collect on the cylindrical inner surface 60 of the wall 58.

The maze 40 also cools the gas flowing into the air bag. Gas flowing out of the container 14 may be relatively high in temperature as a result of heat generated by the initiator assembly 22. It is desirable to cool the gas before directing it into the air bag. In the inflator 10, the gas flows across a relatively large surface area of metal, because of the maze design of the various gas flow passages, prior to flowing into the air bag. This cools the gas prior to its being directed into the air bag. As the gas cools, the molten matter in the gas plates onto the surfaces of the maze 40.

From the above description of the invention, those skilled in the art will perceive improvements, changes and modifications in the invention. Such improvements, changes and modifications within the skill of the art are intended to be covered by the appended claims.

I claim:

1. Apparatus for inflating a vehicle occupant restraint such as an air bag, comprising:

a cylindrical gas source having an outer diameter and having first and second ends and having an axis extending between said ends of said gas source, said gas source being free of filter material;

outlet means in said gas source for establishing axial flow of the gas out of said gas source in a direction axially outwardly from said first axial end of said gas source; and filter means for filtering the gas flow from said outlet means and for directing the gas flow into a diffuser chamber for inflating the vehicle occupant restraint;

said filter means consisting essentially of a maze disposed outside of said gas source and projecting axially outward from said gas source, said maze being coaxial with said gas source, said maze having substantially the same outer diameter as said gas source;

said maze including surfaces disposed in the path of gas flowing from said gas source for splitting the gas flowing from said gas source and for directing a major portion of the split flow of gas into a first flow path and a minor portion of the split flow of gas into a second flow path;

said first flow path being disposed axially outward from said gas source and having substantial circumferential flow path components intermediate said outlet means and said diffuser chamber, said surfaces defining said first flow path including:

(i) a radially extending axial end wall of said maze, (ii) a first annular wall coaxial with said axis and extending axially between said axial end wall and said outlet means and defining therewith a chamber, said first annular wall having a single radial outlet therethrough, (iii) a second annular wall coaxial with said axis and extending axially between said axial end wall and said outlet means, said second annular wall being spaced radially outward from said first annular wall and defining an inner circumferential passage therebetween, said second annular wall having first and second radial outlets therethrough, said first radial outlet being radially aligned with said single radial outlet of said first annular wall, said second radial outlet being offset about 180° from said first radial outlet, and (iv) a third annular wall coaxial with said axis and extending axially between said axial end wall and said outlet means, said third annular wall being spaced radially outward from said second annular wall and defining an outer circumferential passage therebetween, said third annular wall having a single radial outlet therethrough, said single radial outlet of said third annular wall being radially aligned with said single radial outlet of said first annular wall and with said first radial outlet of said second annular wall;

said first flow path including (i) said chamber defined by said end wall and said outlet means and said first annular wall, (ii) said single radial outlet of said first annular wall, (iii) said inner circumferential passage, (iv) said second radial outlet of said second annular wall, (v) said outer circumferential passage, and (vi) and single radial outlet of said third annular wall;

said second flow path being disposed axially outward from said gas source and including (i) said chamber defined by said end wall and said outlet means and said first annular wall, (ii) said single radial outlet of said first annular wall, (iii) said second radial outlet of said second annular wall, and (iv) said single radial outlet of said third annular wall, said second flow path not including said inner and outer circumferential passages and thereby being substantially free of circumferential flow path components intermediate said outlet means and said diffuser chamber and thereby being substantially shorter than said first flow path thereby to establish a rapid initial flow of gas into the vehicle occupant restraint to help establish a desired pressure-time curve for vehicle occupant restraint inflation;

said maze including said inner and outer circumferential passages being free of filter material other than said walls.

2. Apparatus for inflating a vehicle occupant restraint such as an air bag, comprising:

a gas source having first and second ends and having an axis extending between said ends;

outlet means in said gas source for establishing axial flow of the gas out of said gas source in a direction axially outward from said first axial end of said gas source; and filter means for filtering the gas flow from said outlet means and for directing the gas flow into a diffuser chamber for inflating the vehicle occupant restraint;

said filter means comprising a maze connected with said first axial end of said gas source and projecting axially outward from said gas source, said maze being coaxial with said gas source;

said maze including surfaces disposed in the path of gas flowing from said gas source for splitting the gas flowing from said gas source and for directing one portion of the split flow of gas into a first flow path and another portion of the split flow of gas into a second flow path;

said first flow path being disposed axially outward from said gas source and having circumferential flow path components intermediate said outlet means and said diffuser chamber, said surfaces defining said first flow path including:

(i) a radially extending axial end wall of said maze, (ii) a first annular wall coaxial with said axis and extending axially between said axial end wall and said outlet means and with said axial end wall and said outlet means defining a chamber, said first annular wall having a radial outlet therethrough, (iii) a second annular wall coaxial with said axis and extending axially between said axial end wall and said outlet means, said second annular wall being spaced radially outward from said first annular wall and defining an inner circumferential passage, said second annular wall having first and second radial outlets therethrough, said first radial outlet being radially aligned with said radial outlet of said first annular wall, and (iv) a third annular wall coaxial with said axis and extending axially between said axial end wall and said outlet means, said third annular wall being spaced radially outward from said second annular wall and defining an outer circumferential passage therebetween, said third annular wall having a radial outlet therethrough, said radial outlet of said third annular wall being radially aligned with said radial outlet of said first annular wall and with said first radial outlet of said second annular wall;

said first flow path including (i) said chamber defined by said end wall and said outlet means and said first annular wall, (ii) said radial outlet of said first annular wall, (iii) said inner circumferential passage, (iv) said second radial outlet of said second annular wall, (v) said outer circumferential passage, and (vi) said radial outlet of said third annular wall;

said second flow path being disposed axially outward from said gas source and including (i) said chamber defined by said end wall and said outlet means and said first annular wall, (ii) said radial outlet of said first annular wall, (iii) said second radial outlet of said second annular wall, and (iv) said radial outlet of said third annular wall, said second flow path not including said inner and outer circumferential passages.

3. An apparatus as set forth in claim 2 wherein said flow control means comprises a metal casting and includes a radially extending outer end wall cast in one piece with said plurality of annular walls, said casting having substantially the same diameter as said gas source.

4. An apparatus as set forth in claim 2 wherein said first annular wall has a single radial outlet therethrough, said single outlet comprising said radial outlet of said first annular wall, said second radial outlet of said second annular wall being offset about 180° from said first radial outlet of said second annular wall.

5. An apparatus as set forth in claim 2 wherein said maze including said inner and outer circumferential passages is free of filter material other than said walls.

6. Apparatus for inflating a vehicle occupant restraint such as an air bag, comprising:

a gas source having an axis, said gas source including an axial end wall of said gas source, said axial end wall having an inner surface and an opposite outer surface;

a diffuser including a diffuser wall disposed radially outward of said gas source and defining between said gas source and said diffuser wall a diffuser chamber, said diffuser wall including surfaces defining a plurality of diffuser openings from said diffuser chamber for directing gas from said diffuser chamber into the air bag;

outlet means in said gas source for establishing axial flow of the gas from said gas source in a first direction through said end wall and thence into said diffuser chamber; and flow control means for controlling said gas flow, said flow control means being connected with said gas source and in the path of gas flow from said gas source outlet means to said diffuser chamber;

said flow control means being coaxial with and projecting axially outward in the first direction from said gas source end wall outer surface;

said flow control means having means for splitting the flow of gas from said gas source into a radial gas flow component and a circumferential gas flow component;

said means for splitting comprising a plurality of annular walls extending around said axis and defining a radial gas flow path for said radial gas flow component and a circumferential gas flow path for said circumferential gas flow component;

each respective one of said plurality of annular walls having surfaces defining a respective outlet in said respective on annular wall for establishing flow of gas radially outwardly through said respective one annular wall;

said outlets being radially aligned with each other at the same circumferential location around said axis and along a radial path extending radially outwardly from said axis to said diffuser chamber;

said plurality of annular walls defining between them at least one circumferential passage extending circumferentially around said axis from a first one of said outlets;

said circumferential gas flow path including said circumferential passage extending between said gas source and into said diffuser chamber;

said radial gas flow path not including said circumferential passage and including said radial path extending radially outwardly from said axis and into said diffuser chamber;

said diffuser openings being spaced in a second direction opposite to said first direction from said flow control means annular wall outlets thereby blocking direct radial flow of gas from said flow control means annular wall outlets through said diffuser openings.

7. An apparatus as set forth in claim 6 wherein said flow control means comprises a metal casting and includes a radially extending outer end wall cast in one piece with said plurality of annular walls, said casting having substantially the same diameter as said gas source.

8. Apparatus for inflating a vehicle occupant restraint such as an air bag, comprising:

a gas source having an axis;

outlet means in said gas source for establishing axial flow of the gas from said gas source into a diffuser chamber; and flow control means for controlling said gas flow, said flow control means being connected with said gas source and in the path of gas flow from said gas source to said diffuser chamber;

said flow control means being coaxial with and disposed axially outward from said gas source;

said flow control means having means for splitting the flow of gas from said gas source into a radial gas flow component and a circumferential gas flow component;

said means for splitting comprising a plurality of annular walls extending around said axis and defining a radial gas flow path for said radial gas flow component and a circumferential gas flow path for said circumferential gas flow component;

each respective one of said plurality of annular walls having surfaces defining a respective outlet in said respective one annular wall for establishing flow of gas radially outwardly through said respective one annular wall;

said outlets being radially aligned with each other at the same circumferential location around said axis and along a radial path extending radially outwardly from said axis to said diffuser chamber;

said plurality of annular walls defining between them at least one circumferential passage extending circumferentially around said axis from a first one of said outlets;

said circumferential gas flow path including said circumferential passage extending between said gas source and into said diffuser chamber;

said radial gas flow path not including said circumferential passage and including said radial path extending radially outwardly from said axis and into said diffuser chamber;

said plurality of annular walls including a first annular wall and a second annular wall spaced radially outwardly from said first annular wall and defining between them said at least one circumferential passage, said first annular wall having only one outlet therethrough, said second annular wall having at least two outlets extending therethrough including a secondary outlet radially aligned with said single outlet of said first annular wall and a primary outlet spaced circumferentially from said secondary outlet, said primary and secondary outlets dividing said second annular wall into two annular wall segments, said radial gas flow path including said one outlet of said first annular wall and said secondary outlet of said secondary annular outlet, said circumferential gas flow path including said one outlet of said first annular wall and said circumferential passage and said primary outlet of said second annular wall.

9. An apparatus as set forth in claim 8 wherein said plurality of annular walls includes a third annular wall spaced radially outward from said second annular wall, said third annular wall having a single outlet therethrough, said single outlet being radially aligned with said single outlet of said first annular wall and with said secondary outlet of said second annular wall, said radial gas flow path including said single outlet of said third annular wall.

* * * * *

UNITED STATES PATENT AND TRADEMARK OFFICE
CERTIFICATE OF CORRECTION

PATENT NO.   : 5,335,940
DATED        : August 9, 1994
INVENTOR(S)  : Jess Cuevas It is certified that error appears in the above-indentified patent and that said Letters Patent is hereby corrected as shown below:

Column 6, line 4, after "and" insert --connected with said first axial end of said gas source and--.

Signed and Sealed this

Thirty-first Day of January, 1995

Attest:

BRUCE LEHMAN

Attesting Officer

Commissioner of Patents and Trademarks